(12) United States Patent
Pellenc et al.

(10) Patent No.: US 9,668,416 B2
(45) Date of Patent: Jun. 6, 2017

(54) SCALE WITH A STOP RIM FOR A COLLECTING TABLE OF A HARVESTER HEAD FOR HARVESTING SMALL FRUITS, AND HARVESTER HEAD USING SAME

(75) Inventors: Roger Pellenc, Pertuis (FR); Christian Rolland, Cucuron (FR)

(73) Assignee: PELLENC (Societe Anonyme), Pertius (FR)

( * ) Notice: Subject to any disclaimer, the term of this patent is extended or adjusted under 35 U.S.C. 154(b) by 195 days.

(21) Appl. No.: 13/882,854

(22) PCT Filed: Nov. 30, 2011

(86) PCT No.: PCT/FR2011/000628
§ 371 (c)(1),
(2), (4) Date: Jul. 1, 2013

(87) PCT Pub. No.: WO2012/076768
PCT Pub. Date: Jun. 14, 2012

(65) Prior Publication Data
US 2013/0269307 A1    Oct. 17, 2013

(30) Foreign Application Priority Data
Dec. 7, 2010  (FR) ..................................... 10 04753

(51) Int. Cl.
*A01D 46/28*  (2006.01)
(52) U.S. Cl.
CPC .................................. *A01D 46/28* (2013.01)
(58) Field of Classification Search
CPC ...... A01D 23/06; A01D 46/28; A01D 46/285; A01D 46/00–46/30; A01D 2046/262–2046/268
See application file for complete search history.

(56) References Cited

U.S. PATENT DOCUMENTS

| 948,465 A | * | 2/1910 | Branch | ................... | A01D 46/26 |
| | | | | | 56/329 |
| 2,648,942 A | * | 8/1953 | Grant | ..................... | A01D 43/07 |
| | | | | | 171/42 |

(Continued)

FOREIGN PATENT DOCUMENTS

| DE | 2036899 A1 | 2/1972 | |
| EP | 0511125 | * 10/1992 | ............. A01D 46/28 |

(Continued)

OTHER PUBLICATIONS

Tyler Benedict, Jul. 2, 2009, www.bikerumor.com, http://www.bikerumor.com/2009/07/02/and-more-environmentally-sound-food-containers/.*

(Continued)

*Primary Examiner* — Robert Pezzuto
*Assistant Examiner* — Adam Behrens
(74) *Attorney, Agent, or Firm* — Egbert Law Offices, PLLC

(57) ABSTRACT

A scale for a collecting pass-through table used in a small fruit harvesting machine has a plate and a stop rim affixed to the plate and extending upwardly above an upper face of the plate. The stop rim has a flexible lip that is elastically deformable. The stop rim extends in a direction outwardly of a free distal end of the plate. The stop rim has height that prevents the small fruit from moving beyond the free distal end of the plate. The stop rim has a forward end portion that is stiff. The stop rim is removably fastened to the plate at the free distal end thereof.

11 Claims, 8 Drawing Sheets

(56) References Cited

U.S. PATENT DOCUMENTS

| | | | | |
|---|---|---|---|---|
| 3,126,692 A * | 3/1964 | Weygandt | A01D 46/28 | 56/330 |
| 3,184,908 A * | 5/1965 | Rust | A01D 46/28 | 56/330 |
| 3,225,894 A * | 12/1965 | Weygandt | A01D 46/28 | 198/711 |
| 3,255,578 A * | 6/1966 | Pertics | A01D 46/28 | 56/330 |
| 3,325,984 A * | 6/1967 | Christie | A01D 46/28 | 56/330 |
| 3,396,521 A * | 8/1968 | McKibben | A01D 46/28 | 56/12.4 |
| 3,439,482 A * | 4/1969 | Orton | A01D 46/28 | 56/330 |
| 3,449,895 A * | 6/1969 | Pertics | A01D 46/28 | 56/330 |
| 3,462,932 A * | 8/1969 | Pool | A01D 46/26 | 56/329 |
| 3,473,310 A * | 10/1969 | Christianson | A01D 46/26 | 56/329 |
| 3,538,694 A * | 11/1970 | Holloway | A01D 46/28 | 56/330 |
| 3,545,183 A * | 12/1970 | Shepardson | A01D 46/28 | 56/1 |
| 3,579,971 A * | 5/1971 | Sagouspe | A01D 46/28 | 56/330 |
| 3,601,965 A * | 8/1971 | Kaessbohrer | A01D 46/28 | 56/329 |
| 3,613,343 A * | 10/1971 | Sagouspe | A01D 46/28 | 56/330 |
| 3,667,797 A * | 6/1972 | Kilby | A01D 46/26 | 294/103.1 |
| 3,685,266 A * | 8/1972 | Mohn | A01D 46/28 | 56/330 |
| 3,690,054 A * | 9/1972 | De Carlo | A01D 46/28 | 56/330 |
| 3,822,537 A * | 7/1974 | Sell | A01D 46/28 | 56/330 |
| 3,866,401 A * | 2/1975 | Claxton | A01D 46/28 | 56/330 |
| 3,889,454 A * | 6/1975 | Bruel | A01D 46/285 | 56/330 |
| 3,896,612 A * | 7/1975 | McHugh | A01D 46/26 | 56/329 |
| 3,901,005 A * | 8/1975 | Rohrbach | A01D 46/28 | 141/324 |
| 4,114,463 A * | 9/1978 | Garden | A01D 46/28 | 56/330 |
| 4,130,982 A * | 12/1978 | Clary | A01D 46/28 | 56/330 |
| 4,134,251 A * | 1/1979 | Burton | A01D 46/28 | 56/330 |
| 4,150,526 A * | 4/1979 | Burton | A01D 46/28 | 56/329 |
| 4,204,389 A * | 5/1980 | Delfosse | A01D 46/28 | 56/329 |
| 4,241,569 A * | 12/1980 | Bobard | A01D 46/285 | 56/330 |
| 4,251,983 A * | 2/1981 | Burton | A01D 46/28 | 56/330 |
| 4,259,833 A * | 4/1981 | Mohn | A01D 46/28 | 56/329 |
| 4,286,426 A * | 9/1981 | Orlando | A01D 46/28 | 56/330 |
| 4,321,786 A * | 3/1982 | Burton | A01D 46/28 | 56/119 |
| 4,464,888 A * | 8/1984 | Burton | A01D 46/28 | 56/330 |
| 4,702,065 A * | 10/1987 | Littau | A01D 46/28 | 198/819 |
| 5,074,107 A * | 12/1991 | Windemuller | A01D 46/28 | 56/12.8 |
| 5,092,113 A * | 3/1992 | Turunen | A01D 46/28 | 193/7 |
| 5,109,657 A * | 5/1992 | DeVries | A01D 46/28 | 56/330 |
| 5,181,373 A * | 1/1993 | Littau | A01D 46/28 | 56/329 |
| 5,339,612 A * | 8/1994 | Scott | A01D 46/28 | 56/328.1 |
| 5,341,630 A * | 8/1994 | Littau | A01D 46/28 | 56/330 |
| 5,495,708 A * | 3/1996 | Scott | A01D 46/28 | 56/329 |
| 5,647,194 A * | 7/1997 | Scott | A01D 46/28 | 56/328.1 |
| 5,956,933 A * | 9/1999 | Heard | A01D 46/28 | 56/327.1 |
| 6,070,402 A * | 6/2000 | Korthuis | A01D 46/28 | 56/327.1 |
| 6,315,151 B1* | 11/2001 | Hupp | B65D 1/225 | 220/6 |
| 7,650,740 B2* | 1/2010 | Pellenc | A01D 46/28 | 56/329 |
| 7,703,269 B2* | 4/2010 | McKibben | A01D 46/28 | 56/329 |
| 7,748,205 B2* | 7/2010 | Amaro | A01D 46/24 | 56/328.1 |
| 7,818,953 B2* | 10/2010 | Pellenc | A01D 46/28 | 56/10.2 R |
| 8,117,814 B2* | 2/2012 | Sidhu | A01D 46/28 | 56/329 |
| 2008/0307764 A1* | 12/2008 | Johnson | A01D 46/28 | 56/329 |
| 2010/0050585 A1* | 3/2010 | Amaro | A01D 46/24 | 56/13.5 |

FOREIGN PATENT DOCUMENTS

| | | | | |
|---|---|---|---|---|
| FR | 2157824 A1 | 6/1973 | | |
| FR | EP-0511125 A1 * | 10/1992 | | 56/330 |
| GB | 2007074 A | 5/1979 | | |

OTHER PUBLICATIONS

International Search Report for corresponding International Application No. PCT/FR2011/000628.

* cited by examiner

SCALE WITH A STOP RIM FOR A COLLECTING TABLE OF A HARVESTER HEAD FOR HARVESTING SMALL FRUITS, AND HARVESTER HEAD USING SAME

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a scale with a stop rim for a collecting table of a harvester head of a small fruits. It also concerns the harvester heads making use of same, in particular the harvester heads of a seamless pass-through table.

More particularly, it applies to harvesting machines of small fruit not laden with juice and sugar, such as olives, hazelnuts, nuts, almonds produced by trees or bushes grown in rows.

This interesting application is however not limiting, as the invention may also be used for the harvesting of other small fruit produced by trees, bushes or hedges grown in rows, such as grapes, currants, gooseberries, blueberries cranberries, plums, the cherry-like fruit of coffee shrubs.

2. Description of Related Art Including Information Disclosed Under 37 CFR 1.97 and 37 CFR 1.98.

Advantageously, the invention is applicable to harvesting heads of the type that include a straddling frame in the shape of a gantry, this straddling frame supporting in particular, on the one hand, a shaking system constituted by two fruit-picking assemblies mounted opposite each other and separated by a space or vertical passage-way, and, on the other hand, by a receiving and conveying system, to receive the detached fruit from the shaken trees and to direct them to a large volume collecting container, for example consisting of a bucket installed on each side and in the high portion of the frame of the machine equipped with the harvesting head, or of the bucket of a vehicle being driven alongside said machine. The receiving and conveying system of the picked fruit comprises two assemblies mounted symmetrically on either side of the vertical median of the harvester head.

At the present time one applies primarily two methods of implementation of the receiving and conveying system for the fruit picked by the harvester heads of this kind.

According to one of these methods of implementation, this system is constituted by two receiving and conveying assemblies placed on either side of the median vertical plane of the harvester head. Each of these assemblies is made in the form of a noria consisting of a succession of buckets and so configured as to constitute not only a collection plane during its lower horizontal travel but also a conveyor suitable for transporting the picked fruit towards the receiving device of the harvest.

According to this method of implementation, the norias of receiving buckets are driven at a speed that is identical to that of the forward speed of the harvesting machine, so that said receiving buckets, during their lower travel, have a forward speed of zero relative to the trunk or base of the fruit-bearing shrubs they are in contact with.

Although this technical solution provides good tightness while passing the stakes and shrub bases, it presents nevertheless several disadvantages.

A first disadvantage derives from the fact that the receiving buckets most necessarily advance at a speed equal to that of the forward speed of the machine, because otherwise these buckets would quickly lose their usefulness due to the shock resulting from their contact with the base of the shrubs. Under these conditions, in case of heavy production, i.e., when the harvest is abundant, the limited capacity of the buckets makes it impossible to receive and transport the excessive volume of harvested berries.

Another disadvantage is the high cost of this system.

Furthermore the buckets are relatively fragile, so that they are liable to deteriorate, for example due to faulty synchronization between the forward speed of the machine and the forward speed of said buckets or in case of slipping of said machine, for example on sodden ground.

According to a second technical solution, the receiving and transporting system of picked fruit comprises two parallel and adjoining assemblies mounted in the low part of the straddling frame, on either side of the median vertical plane of the harvester head.

At present this system comprises, on the one hand, a collecting plane or articulated pass-through table constituted by overlapping, tilted and pivoting plates or scales, and, on the other hand, two devices for transferring the raw picked harvest dumped by the articulated table, on either side of the latter.

The articulated table for receiving the fruit picked from the bushes is formed by two sub-assemblies, each consisting of a number of pivoting scales positioned one behind the other, partially covering each other, with an orientation opposite to the forward direction of the harvester head, when in operation. According to this arrangement, the inside edge of the row of scales of one of the sub-assemblies of the articulated pass-through table, covers the internal edge of the row of scales of the other sub-assembly.

These scales are constituted by plates made of an appropriate plastic material such as polyester amide or polyethylene or any other plastic material having the necessary rigidity. They have an elongated shape and include a fastening or proximal end so they can be mounted with a pivoting range on a longitudinal horizontal support that is integral with the chassis of the harvesting head, and a free or distal end; they often present a general configuration that is approximately trapezoidal and a width that increases in the direction of their free distal end.

Harvester head using such collecting scales are well known by the expert; they can be found nowadays on the vast majority of grape picking machines with them and, just recently on some harvesting machines of other small fruit produced by small sized trees, such as olives.

The working principle of this harvester head is to detach the fruit of shrubs or trees grown in rows by straddling and shaking them. The machine advances in the row, the shrubs or trees straddled by it pass into the harvesting tunnel of the harvester head and are shaken by the bearing device. A portion of the fruit picked from the trees or bushes is projected against lateral canvas tarpaulins located on both sides of the beating device and parallel to the traveling direction of the machine. These lateral tarpaulins serve to absorb the impact of the fruit so it does not get damaged and they also serve to prevent the fruit from being ejected out of the machine, on its sides. The other portion of the fruit picked from the tree, as well as the portion of fruit projected against the canvas tarpaulins, fell on the rigid scales or into the conveyors, either directly or by bouncing on the tree or bush branches. The scales on the left are slightly shingled following the traveling direction of the machine and they are tilted so as to direct the fruit towards the left conveyor. The scales on the right are slightly shingled following the traveling direction of the machine and they are tilted so as to direct the fruit towards the right conveyor. The conveyors then move the picked fruit to a collection recipient. All the left scales and all the right scales are slightly shingled in the center of the harvester head to reduce as much as possible the spaces through which the fruit could escape. The scales of each subassembly are fastened, through the intermediary of their external end and by means of an elastic articulation, generally of the "Silentbloc"© type, on a fixed ramp integral with the chassis of the harvester head. When a vinestock or a tree trunk is passed it pushes on the scales which retract because of the "Silentbloc"©. In this way the shape of the trunk can be followed as much as possible to reduce the size of the spaces through which a certain quantity of fruit could escape.

This system of receiving table consisting of retractable scales is well suited for harvesting grapes, but it presents several disadvantages for the harvesting of other small fruit such as olives, hazelnuts, nuts, almonds, these disadvantages resulting from the structure of the collection plates or scales which presently equip the reception planes or tables of the harvesting heads.

A first disadvantage derives from the diameter of the tree trunks which are generally larger than the trunks of vinestock. As a consequence the scales are spread apart further as they pass the tree trunks and thereby increase the empty spaces through which the fruits can escape.

A second disadvantage comes from the length of the friction surfaces of the scales on the tree trunks and the necessary stillness of the "Silentblocs"© which allow said scales to retract as they pass a trunk. The effort that is required for retracting a scale is exponential to its displacement. Therefore, the greater the diameter of the tree trunk, the more effort needs to be supplied by the trunk to displace the scales. The scales have thus a tendency to chafe the trunks of large trees, in particular the trunks of olive trees which are more delicate than the trunks of vinestocks.

A third disadvantage comes from the feet that olives, hazelnuts, nuts, almonds etc. are not sweet and sticky fruits like grapes. They behave more like small balls which bounce and roll along on any surface. Therefore, the empty spaces made between two rows of scales to leave some functional play for shingling, those due to shingling of the left and right scale assemblies and those created by passing tree trunks represent as many possibilities for the loss of fruits escaping from the harvester head.

It has been proposed (DE 2 036 899, GB 2 007 074), to avoid damaging the plant trunks or to prevent the berries etc. from rolling out of the scales, to equip the edge of the distal part of the scales with a rim intended to form a blunted border which does not injure the plants, and to bar the ejection of the harvested berries. Such a rim has also been provided in the document FR-2-157,824 to recover the juice dropping from the receiving scales at the same time as the bunches and the seeds of grapes picked from the vinestocks by the harvesting machine.

If the provision of a rigid rim as a border of the distal part of the scale does indeed allow the recovery of a certain amount of grape juice, it would not make it possible, in a potential application for the harvesting of olives which is not mentioned in the afore-mentioned documents, to solve the problems resulting from the first and third aforementioned disadvantages, nor would it provide a very satisfactory resolution for the problem caused by the second of these disadvantages.

The particular objective of the present invention is to resolve the problems caused by the aforementioned disadvantages.

BRIEF SUMMARY OF THE INVENTION

According to the invention, this objective has been achieved by means of a collecting scale featuring an upper and a lower face comprised between a fastening or proximal end and a free or distal end, the border of said distal end being provided with a stop rimming above the plane in which said upper face is comprised, and, according to an important characteristic disposition, said stop rim is constituted by a flexible lip with a capacity for elastic deformation.

According to an advantageous method of implementation, the stop rim features an outward leaning part rising in the direction away from the edge of the distal end of the scale.

The stop rim presents a height that is capable of preventing the fruits rolling or sliding on the upper surface of the scales from moving beyond the edge of the distal end of the scales.

Advantageously, the plate constituting the body of the scale is made of a material with good shock and wear resisting qualities such as, for example, polyamide or polyethylene or other plastic material presenting the necessary rigidity, whereas the soft peripheral lip is made of polyurethane or another synthetic elastomer, or rubber.

Interestingly, the soft lip is attached, preferably in a removable manner, for example by screws, on the periphery of the distal part of said plate, but it may also be formed as a single part with the body or remaining part of the scale by a known molding method.

According to another characteristic disposition, the forward end part of the stop rim which is the one by which the latter comes into contact with the trunks of trees or bushes, as the harvester head advances, is so shaped as to provide superior rigidity to the remaining part of said stop rim so as to resist its flexion in the direction of the ground as it encounters said trunks.

The invention also concerns the harvester heads equipped with a collecting plane or pass-through table formed by two sub-assemblies positioned on either side of the median vertical plane of said harvester head, each of these sub-assemblies being constituted by a number of pivoting scales featuring the aforementioned characteristics said scales being arranged in succession with an orientation in the opposite direction of the travel of the harvester head each scale of one of said sub-assemblies being abutted, through the intermediary of its distal end, against a scale of the other sub-assembly.

Each of the collecting semi-planes constituted by these sub-assemblies features a rippled barrier resting on the tippled barrier of the other collecting semi-plane, this rippled barrier extending from one end to the other of each row of scales.

During the travel of the harvester head over a row of fruit-bearing shrubs, the barriers constituted by the succession of stop rims the distal part of the scales is provided with, follows the shape of the trunks of the latter without damaging them, by deforming itself like a membrane. This continuous and seamless barrier prevents the fro its which is capable of rolling or sliding on these collecting semi-planes from moving over the inside rims. In this manner, all the fruits received by each collecting semi-plane will be discharged onto the adjacent lateral conveyor.

BRIEF DESCRIPTION OF THE DRAWINGS

The above aims, characteristics and advantages, and still more, will become clearer from the following description and the attached drawings in which.

Figure 1:
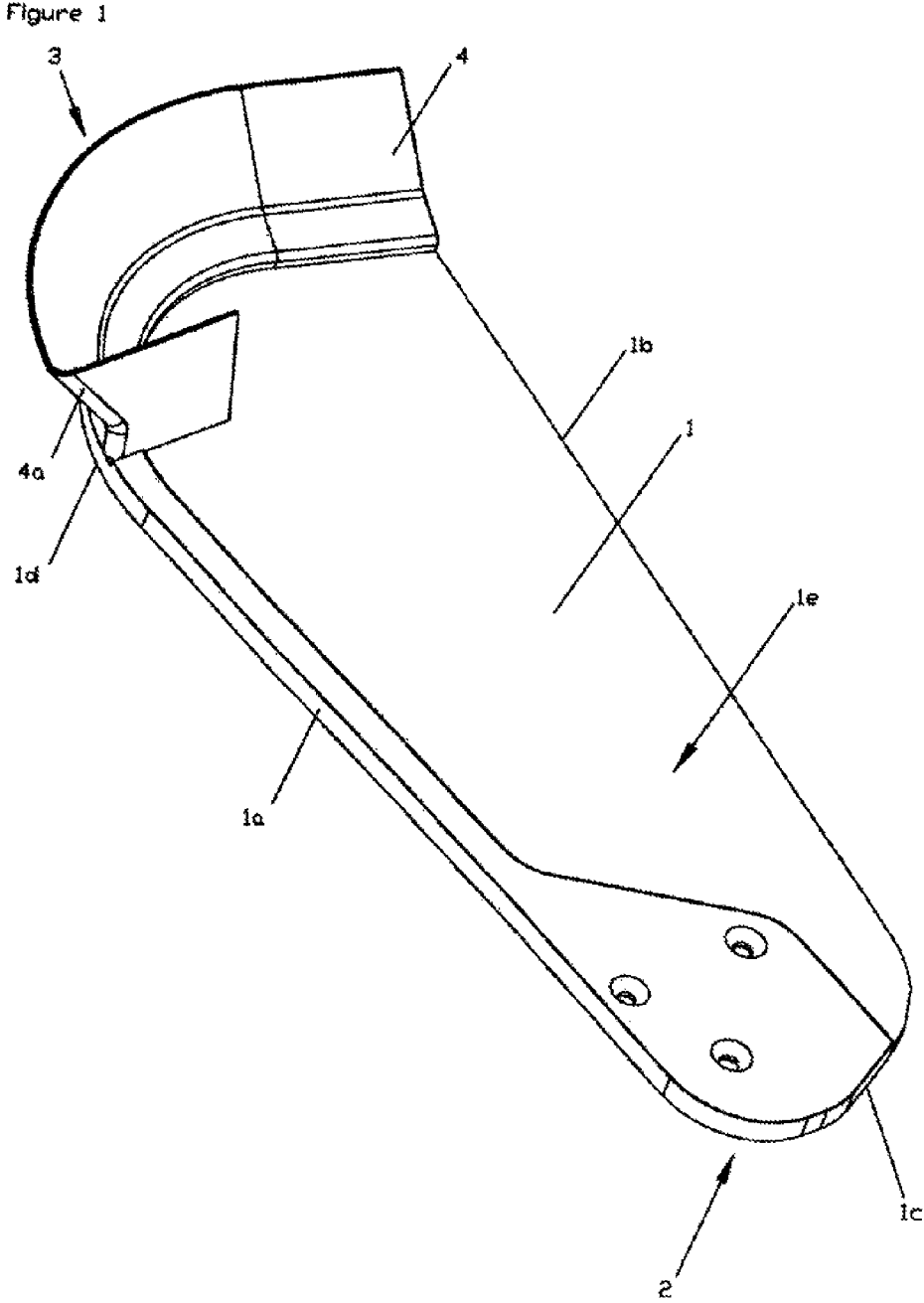
FIG. 1 is a perspective view of an example of production of a scale with flexible stop rim according to the invention.
Figure 2:
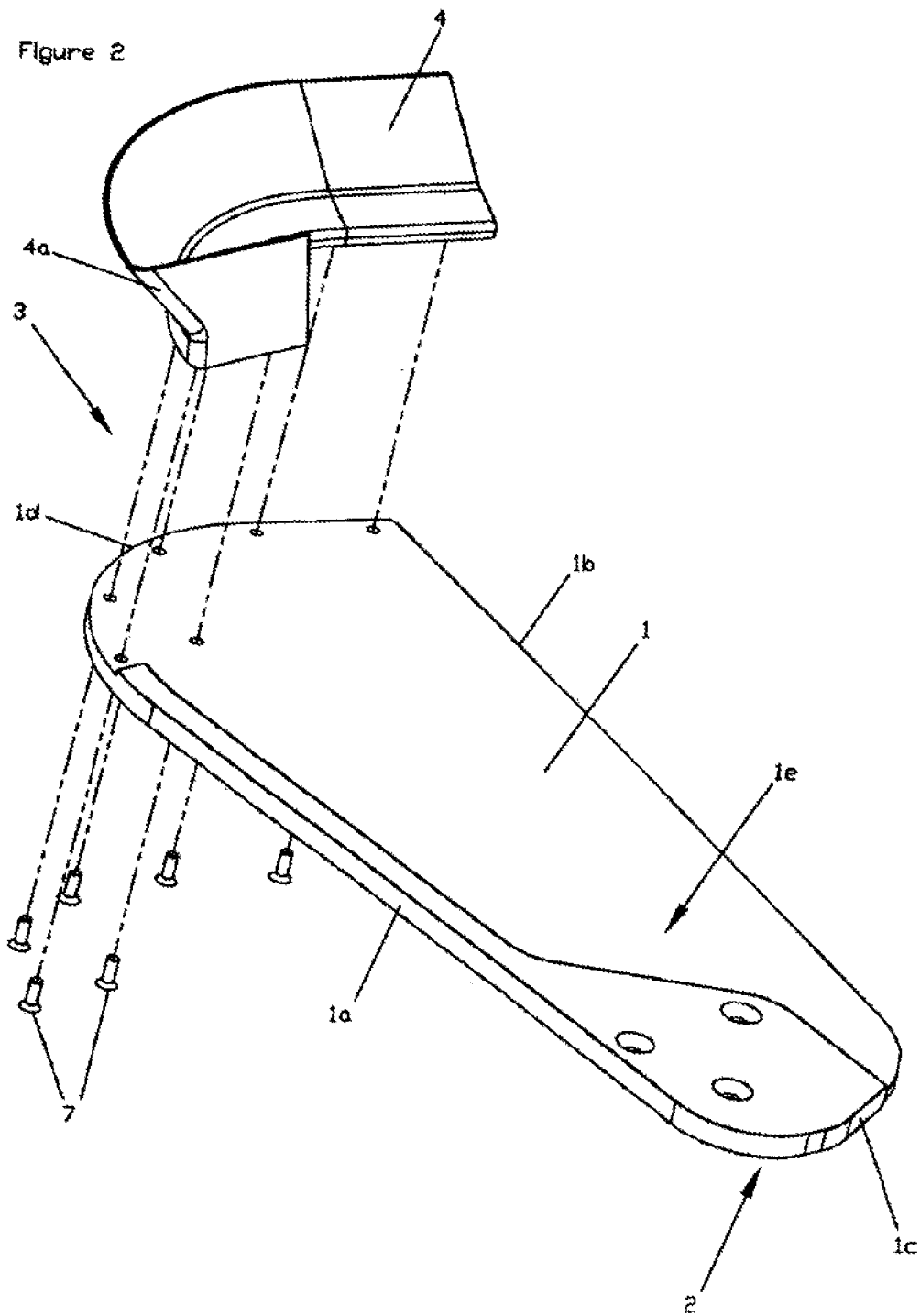
FIG. 2 is an exploded perspective view of the scale shown in FIG. 1.
Figure 3:
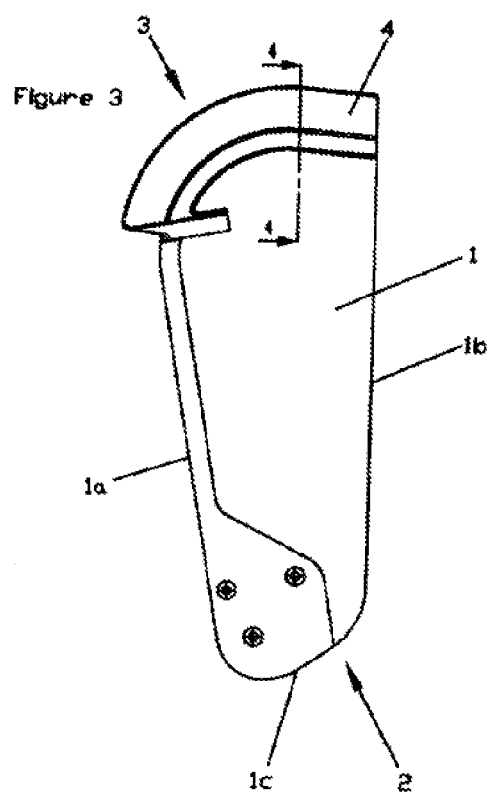
FIG. 3 is a plan view of this scale.
Figure 4:
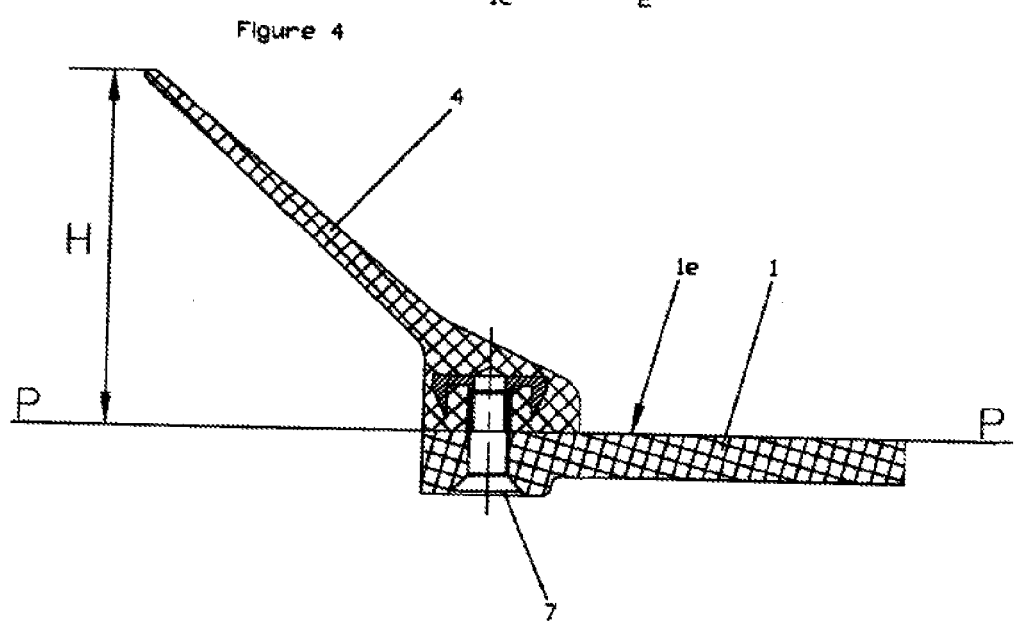
FIG. 4 is a detailed section view along line 4-4 of FIG. 3.
Figure 5:
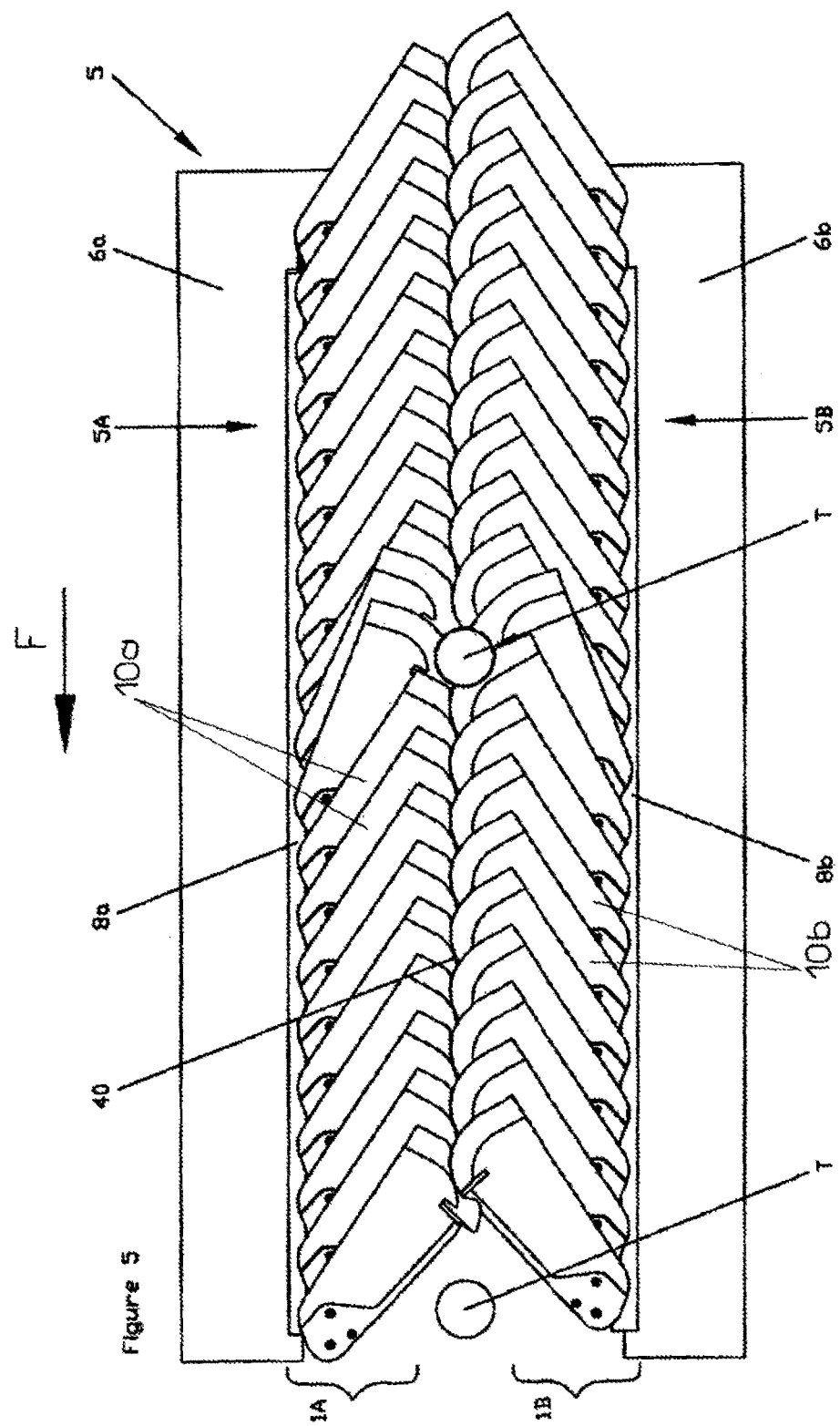
FIG. 5 is a top view of a collecting plane or table of a harvester head of small fruit, constituted by two rows of scales, this figure showing the tightness obtained by means of this pass-through table during the passage of the trunk of a fruit-bearing shrub.
Figure 6:
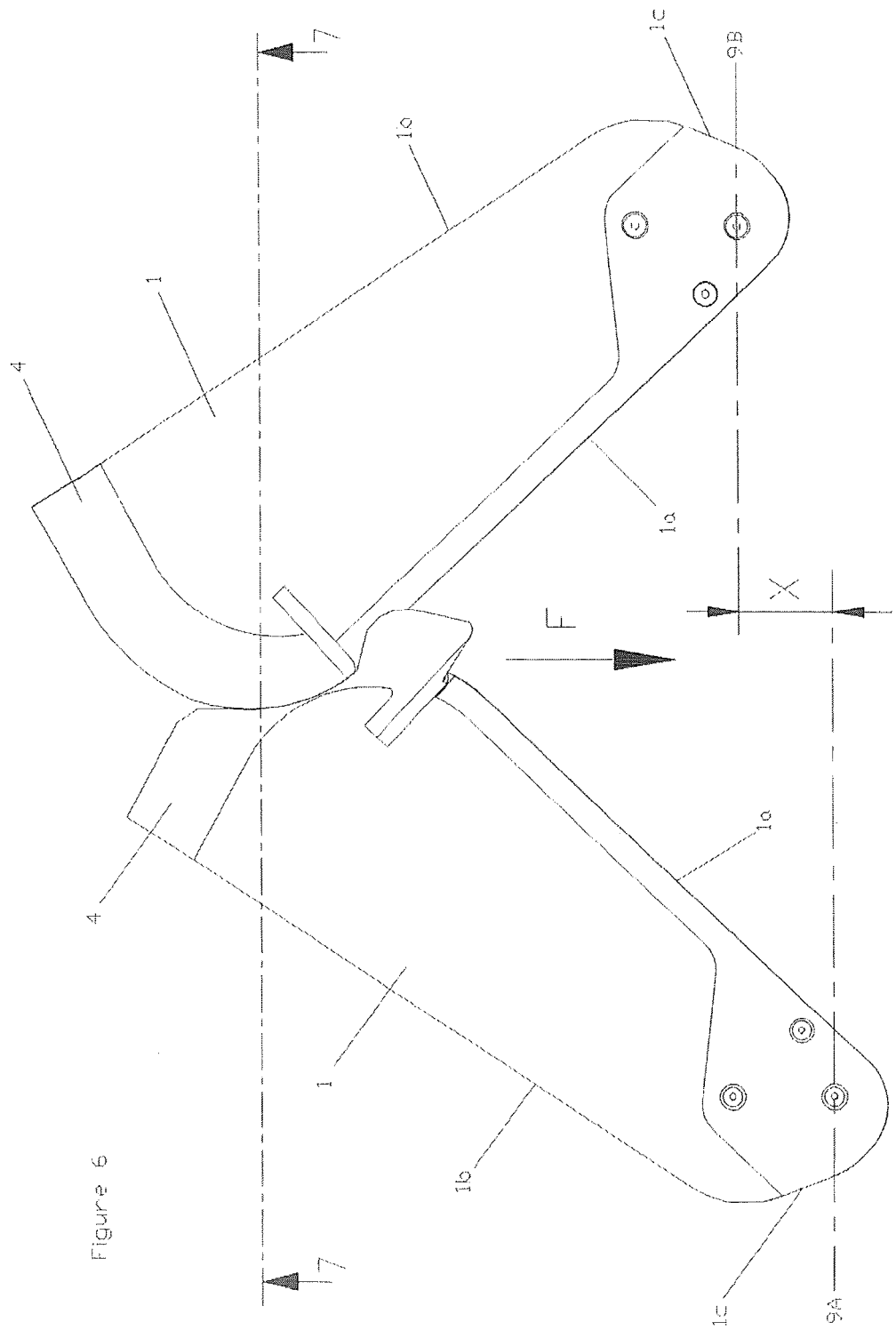
FIG. 6 is a plan view showing the abutment and the staggered mounting of two scales belonging to two collecting semi-planes.
Figure 7:
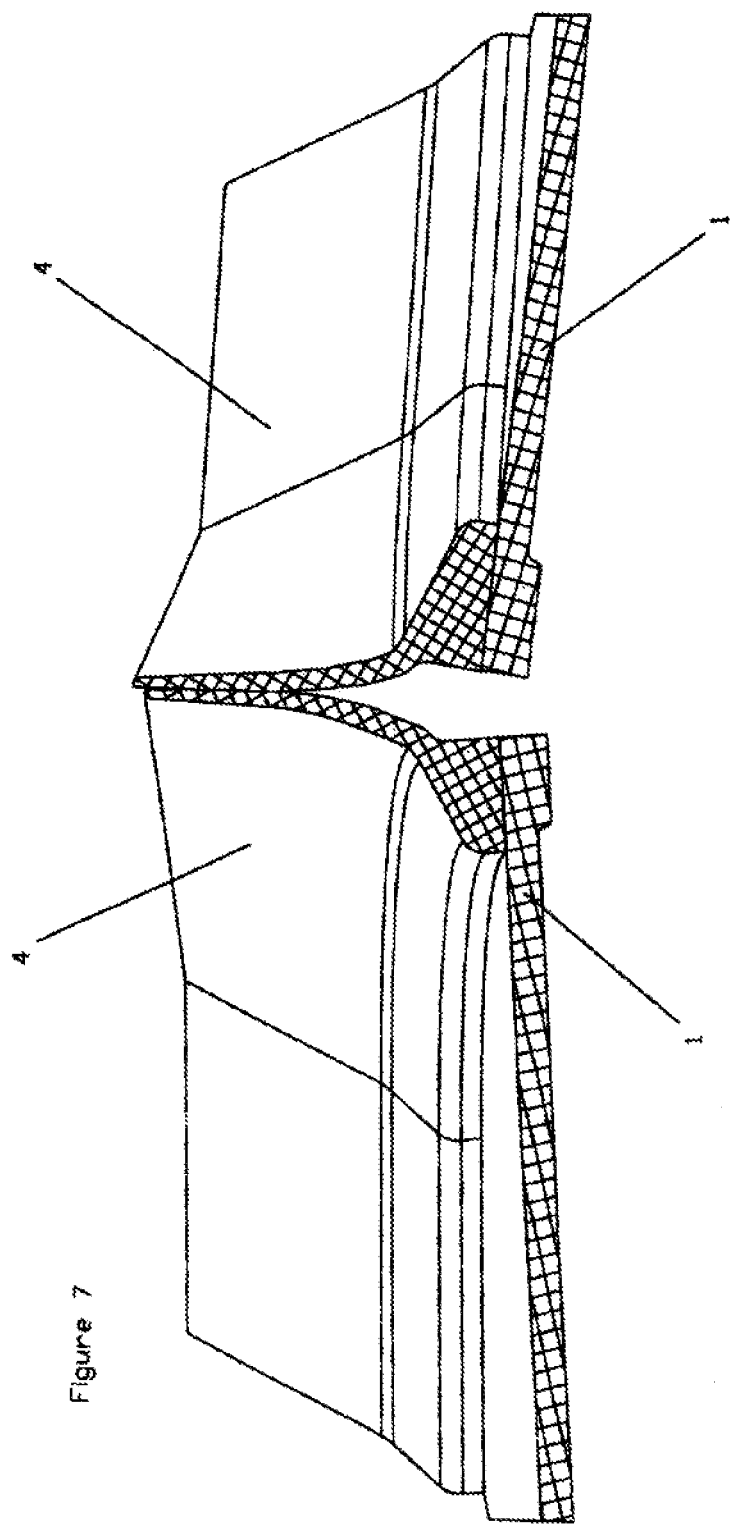
FIG. 7 is a section view at enlarged scale along the line 7-7 of FIG. 6.

Reference is made to these drawings to describe an advantageous example of implementation, although not limiting, of the scale with flexible rim and of the articulated pass-through table according to the invention.

DETAILED DESCRIPTION OF THE INVENTION

In the description and claims, the terms "upper" and "above" refer to the operational position of the scales.

On the other hand, the terms "internal" and "external" refer, respectively, to a near positions and a far position of the median plane from the harvester head.

Scale 1 to which the invention refers is of the type constituted by a plate of an essentially trapezoidal configuration demarcated by two rectilinear longitudinal edges, 1a and 1b, and by curved end edges 1c, 1d. It comprises a proximal part 2 through the intermediary of which it can be fastened, by means of an elastic articulation, on a carrying rack integral with the chassis of the harvester head, and a free distal part 3. It presents an increasing width beginning at its proximal part 2, towards its distal part 3.

The rectilinear edge 1a will be called "forward edge", whereas the rectilinear edge 1b will be called "rear edge", in reference to the positioning of the scales and to the traveling direction of the harvester head.

According to an important characteristic disposition of the invention, the rim or circumference nee of the distal end 3 of the plate 1 is provided with a stop rim 4 rising above the plane P-P in which is comprised the upper face 1e of plate 1, and this stop rim 4 is constituted by a flexible lip with elastic deformation capacity.

On the other hand, according to another characteristic disposition, the flexible lip 4 extends in the direction of the outside of the rim or circumference of the distal end 3 of plate 1, over its entire periphery.

Advantageously, the plate 1 constituting the body of the scale is made of a material presenting good shock and wear resisting qualities such as, for example, polyamide or polyethylene or other plastic material presenting the required rigidity to serve its function, and, more precisely, "Bergamid 66-A70" (trademark), whereas the peripheral flexible lip is made of polyurethane, other synthetic elastomer or rubber.

According to another characteristic disposition, the flexible rim or projecting lip 4 is inclined in relation to the plane P-P in which is comprised the upper face 1e of the plate 1.

Preferably, the flexible rim or lip 4 is attached removably or interchangeably on the periphery of the distal end 3 of plate 1; for example, said flexible rim or lip 4 is fastened by a threaded joint, by means of screws 7, on plate 1.

The flexible lip 4 may however be formed of a single piece with the body or remaining part 1 of the scale, by any molding method known as such.

The flexible rim or lip 4 presents a height H capable of preventing the fruits rolling or sliding towards said rim on the upper surface 1e of the scales from moving past the rim of the distal end 3 of the scales.

According to another characteristic disposition, the forward end part 4a of the stop rim which is the one by which the latter comes into contact with the trunks T of trees or shrubs, as the harvester head travels forward, is shaped so as to provide superior rigidity for the remaining part of said stop rim so as to prevent its bending in the direction of the ground when it comes into contact with said trunks.

This strengthening can be obtained by providing a return extending in the direction of the central part of the scale and attached to the forward end of the stop rim 4 so as to constitute a rib or cant, of rigidity. Alternately, this could also be obtained by a thickening of the forward part 4a relative to the remaining portion of the stop rim.

The invention concerns also a harvester head for small fruit of the type featuring a collecting plane or articulated pass-through table 5 comprising two sub-assemblies or collecting semi-planes 5A, 5B, constituted, each, of a number of scales mounted with an aptitude of pivoting on fixed ramps 8a, 8b integral with the chassis (not shown) of the harvester head, and positioned in succession, partially covering each other, in the longitudinal direction, with an orientation opposite to the direction of travel of the harvester head while in operation. More precisely, in each row of scales 5A, 5B, the rear longitudinal edge 1b of each scale covers partially the forward longitudinal edge 1a of the next scale during the passage of the tree trunks T, the scales pivot in the backward direction, gliding on the next scale.

According to the present invention, each sub-assembly 5A, 5B is constituted by a number of scales 10a or 10b featuring the characteristics disclosed below, each scale of one of said sub-assemblies 5A, 5B being abutted, through the intermediary of its distal end 3 which may be advantageously equipped with a flexible outward leaning lip 4, against the distal end of a scale likewise provided with a flexible outward leaning lip of the other sub-assembly.

The inside edge of each sub-assembly or collecting semi-plane 5A, 5B thus constituted by a row of scales 10a or 10b, according to the invention positioned in succession, presents a continuous, seamless and rippled stop rim 40 extending from one end to the other of said row. The scales constituting the collecting plane or pass-through table, that is to say the scales of each sub-assembly 5A, 5B, are mounted with an identical inclination descending in the direction of the lateral conveyors 6a, 6b, the return belt of which is positioned in proximity and at the outside of the scale rows 5a, 5B, respectively, so as to dump the fruit onto said conveyors.

According to this advantageous method of implementation, the distal ends or tree ends of the scales of each sub-assembly are not placed in an overlapping arrangement of the distal ends of the other subassembly. The axes of articulation 9A, 9B of the scales of one of the sub-assemblies 5A or 5B are offset by a half-step X, relative to the axes of articulation of the scales of the other sub-assembly 5B or 5A.

Figure 8:
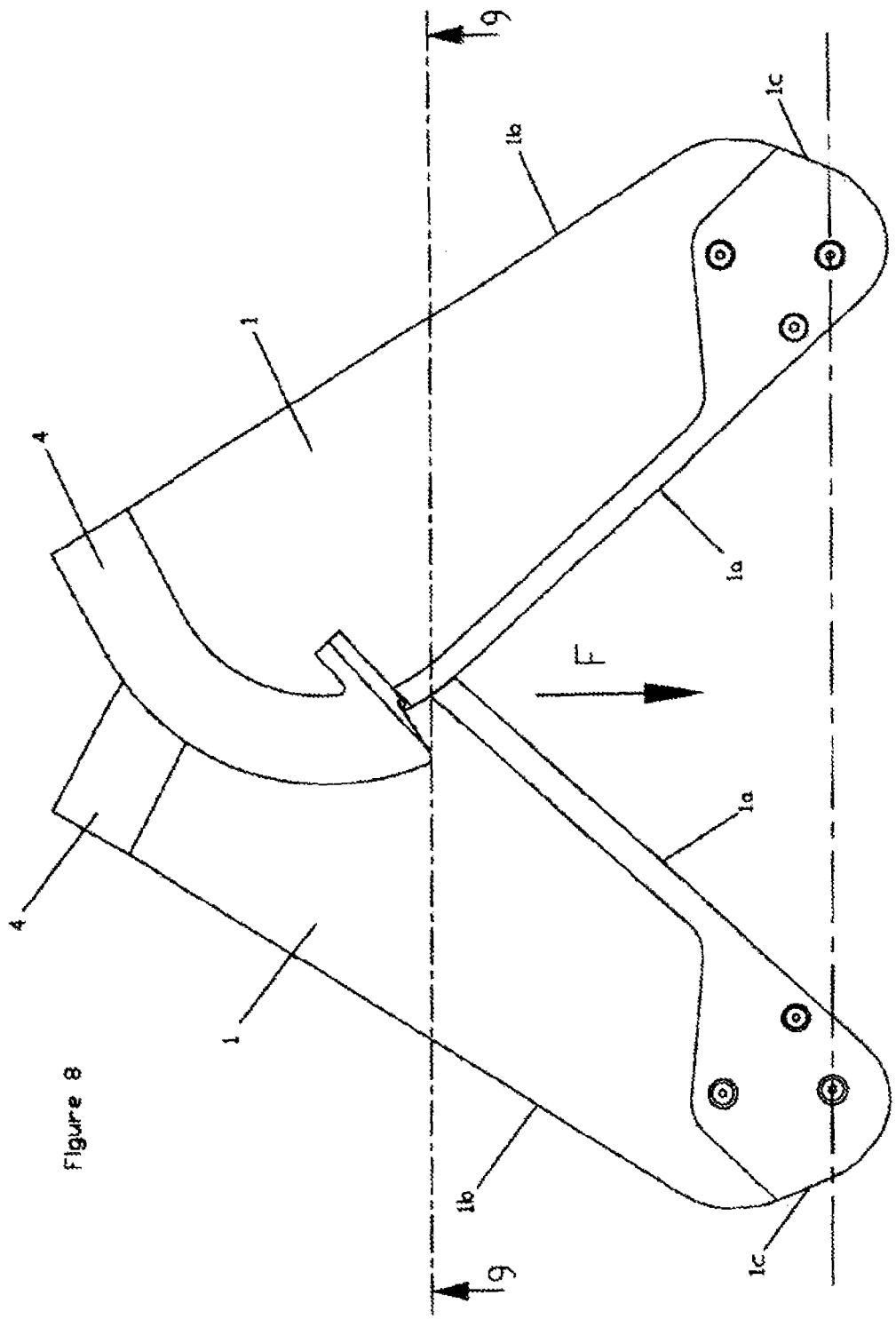
FIG. 8 is a plan view illustrating another way of positioning the scales.
Figure 9:
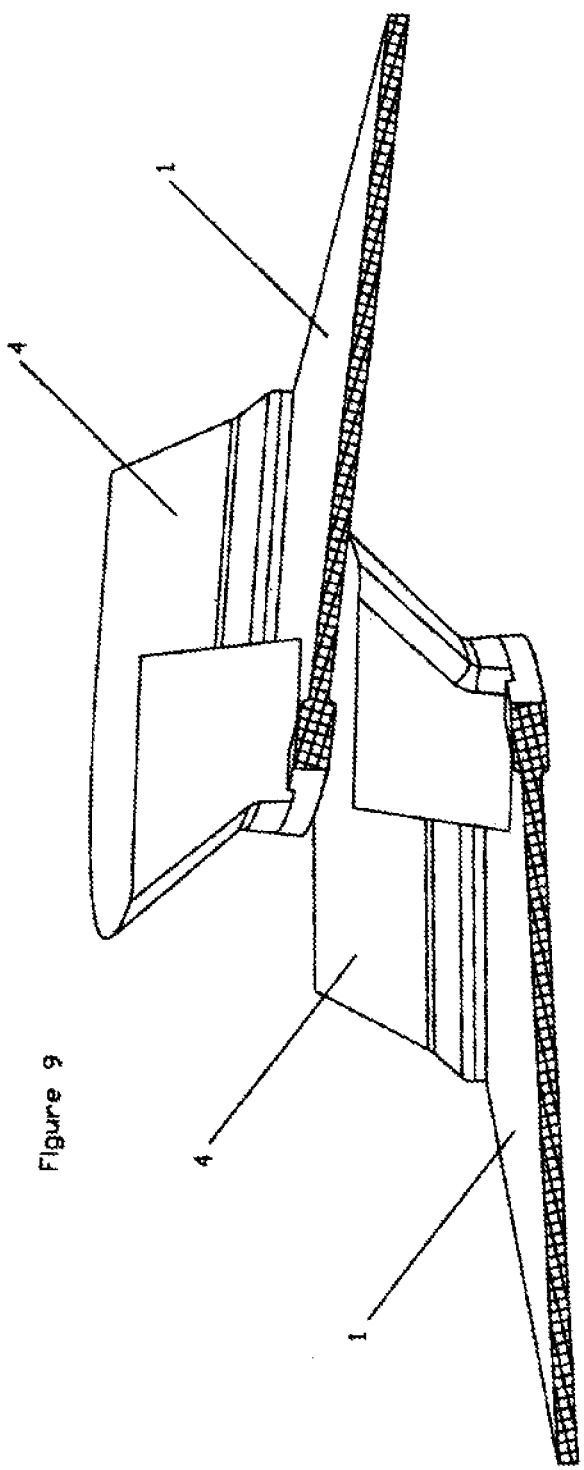
FIG. 9 is a section view at enlarged scale along line 9-9 of FIG. 8.

However, it would also be possible to produce the pass-through table with two collecting semi-planes mounted with a different inclination so that the inside edge of one of said collecting semi-planes is placed in partial recovery of the inside edge of the other collecting plane, as shown in FIGS. 8 and 9.

The invention claimed is:

1. A scale for a collecting pass-through table used in a small fruit harvesting machine, the scale comprising:
   an elongated plate having an upper face and a lower face, said elongated plate having a proximal end and a free distal end, said plate being rigid, said proximal end being a fastening end, said elongated plate having an increasing width from said proximal end to said free distal end; and
   a stop rim partially surrounding the free distal end of the plate; said stop rim rigidly affixed to the free distal end of said elongate plate and extending upwardly above a plane of said upper face, said stop rim having a flexible lip that is elastically deformable, said stop rim extending outwardly of said free distal end, said stop rim being tilted in relation to said plane of said upper face, said stop rim having a forward end portion configured to face a working direction of the small fruit harvesting machine that is stiffened by an inwardly turned portion that extends in a direction toward a center of said upper face of said elongate plate so as to prevent a downward bending of said stop rim.

2. The scale of claim 1, said stop rim having a height adapted to prevent small fruit from moving beyond said free distal end of said elongated plate.

3. The scale of claim 1, said forward end portion being a rib.

4. The scale of claim 1, said forward end portion of said stop rim having a thickness that is greater than a thickness of a remainder of said stop rim.

5. The scale of claim 1, said stop rim being removably fastened to said elongated plate at said free distal end thereof.

6. The scale of claim 1, said elongated plate being formed of a polyamide or a polyethylene material, said stop rim being formed of a polyurethane or rubber or synthetic elastomeric material.

7. An apparatus comprising:
   a small fruit harvesting head having an articulated pass-through table, said articulated pass-through table having a pair of sub-assemblies, each of said pair of sub-assemblies having a plurality of pivoting scales arranged in succession to each other, each of said plurality of pivoting scales comprising:
      an elongated plate having an upper face and a lower face, said plate having a proximal end and a free distal end, said plate being rigid, said proximal end being a fastening end, said elongated plate having an increasing width from said proximal end to said free distal end; and
      a stop rim partially surrounding the free distal end of the plate; said stop rim rigidly affixed to the free distal end of said elongate plate and extending upwardly above a plane of said upper face, said stop rim having a flexible lip that is elastically deformable, said stop rim extending in a direction outwardly of said free distal end, said stop rim being tilted in relation to said plane of said upper face, said stop rim having a forward end portion configured to face a working direction of the small fruit harvesting machine that is stiffened by an inwardly turned portion that extends in a direction toward a center of said upper face of said elongate plate so as to prevent a downward bending of said stop rim when contacting a trunk of a tree bearing the small fruit.

8. The apparatus of claim 7, further comprising:
   at least one lateral conveyor, each of said plurality of pivoting scales being mounted with identical inclinations descending in a direction toward the lateral conveyor, the scale of one of said pair of sub-assemblies abutting the distal end of the scale of the other of said pair of sub-assemblies.

9. The apparatus of claim 8, each of the scales having an articulation axis, the articulation axis of the scales of one of said pair of sub-assemblies being offset by a half-step from the articulation axis of the scales of the other pair of sub-assemblies.

10. The apparatus of claim 7, said pair of sub-assemblies being mounted with different inclinations such that an inner edge of one of said pair of sub-assemblies is positioned inwardly of an inner edge of the other of said pair of sub-assemblies.

11. The apparatus of claim 7, said plurality of pivoting scales comprising rows of scales, the apparatus further comprising:
   a continuous barrier formed by a succession of the stop rims so as to extend along an inside edge of the row of scales along an entire length thereof.

* * * * *